(12) United States Patent
Chen et al.

(10) Patent No.: US 10,243,384 B2
(45) Date of Patent: Mar. 26, 2019

(54) BATTERY CHARGE APPARATUS AND CHARGE SYSTEM

(71) Applicant: Chicony Power Technology Co., Ltd., New Taipei (TW)

(72) Inventors: Chien-Hung Chen, New Taipei (TW); Chao-Ching Hsu, New Taipei (TW); Chu-Yen Wu, New Taipei (TW); Chung-Shu Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 213 days.

(21) Appl. No.: 15/291,647

(22) Filed: Oct. 12, 2016

(65) Prior Publication Data

US 2017/0346327 A1 Nov. 30, 2017

(30) Foreign Application Priority Data

May 24, 2016 (TW) .............................. 105116092 A (51) Int. Cl.
*H02J 7/00* (2006.01)
*H02J 7/04* (2006.01)

(52) U.S. Cl.
CPC .......... *H02J 7/0068* (2013.01); *H02J 7/0013* (2013.01); *H02J 7/0045* (2013.01); *H02J 2007/0001* (2013.01); *H02J 2007/0049* (2013.01); *H02J 2007/0096* (2013.01)

(58) Field of Classification Search
USPC .......... 320/16, 119, 107, 134, 109, 117, 118, 320/121, 122, 124, 126, 137, 104, 108
See application file for complete search history.

(56) References Cited

U.S. PATENT DOCUMENTS

| | | | | | |
|---|---|---|---|---|---|
| 7,589,497 | B2* | 9/2009 | Taylor | ................... | H01M 6/425 320/116 |
| 7,994,754 | B2* | 8/2011 | Seo | ...................... | H01M 10/052 320/116 |
| 8,288,992 | B2* | 10/2012 | Kramer | ................. | H02J 7/0016 320/117 |
| 8,305,046 | B2* | 11/2012 | Brereton | ............. | B60L 11/1816 320/163 |

(Continued)

*Primary Examiner* — Alexis B Pacheco
(74) *Attorney, Agent, or Firm* — Muncy, Geissler, Olds & Lowe, P.C.

(57) ABSTRACT

A battery charge apparatus and a charge system are disclosed. The charge apparatus includes first and second charge module connected to each other. The first charge module is connected to an auxiliary power, makes a processor thereof generate a charge-unit-address code for the charge unit thereof, and turns on an auxiliary switch thereof for transmitting the auxiliary power to the second charge module for activated the second charge module. The second charge module then sends a charge-module-address request to the first charge module to ask for a charge-module-address code. Thereafter, the first charge module performs charge procedure and informs the second charge module to perform charge procedure when battery connected to the first charge module is fully charged. The second charge module then performs charge procedure and sends fully charged information to the first charge module when the battery connected to the second charge module is fully charged.

18 Claims, 7 Drawing Sheets

(56) References Cited

U.S. PATENT DOCUMENTS

| | | | | |
|---|---|---|---|---|
| 8,558,508 B2* | 10/2013 | Fechalos | ............ | G01R 31/3606 |
| | | | | 320/132 |
| 2006/0152189 A1* | 7/2006 | Ambrosio | ............. | B60L 3/0046 |
| | | | | 320/104 |
| 2009/0309547 A1* | 12/2009 | Nakatsuji | ............ | H01M 10/441 |
| | | | | 320/134 |
| 2012/0139477 A1* | 6/2012 | Oglesbee | .................. | H02J 7/00 |
| | | | | 320/107 |
| 2012/0293112 A1* | 11/2012 | Suzuki | ................ | H01M 10/482 |
| | | | | 320/107 |
| 2013/0320918 A1* | 12/2013 | Ohmer | .............. | H01M 10/4207 |
| | | | | 320/107 |
| 2014/0117936 A1* | 5/2014 | Taniguchi | ............ | H02J 7/0019 |
| | | | | 320/126 |
| 2014/0152234 A1* | 6/2014 | Herrmann | ............. | H02J 7/0055 |
| | | | | 320/107 |
| 2015/0180232 A1* | 6/2015 | Mino | ........................ | H02J 1/08 |
| | | | | 307/23 |
| 2017/0163088 A1* | 6/2017 | Toyoda | ................... | H02J 9/061 |
| 2017/0168130 A1* | 6/2017 | Hase | ..................... | H02J 7/0021 |

\* cited by examiner

BATTERY CHARGE APPARATUS AND CHARGE SYSTEM

BACKGROUND

Technical Field

The present disclosure relates to a battery charge apparatus. More particularly, the present disclosure relates to multistage battery charge apparatus and charge system.

Description of Related Art

Because of the demands on power and endurance, other large electric power products, such as unmanned aircraft, electrically-powered vehicles, and electrically-powered two-wheel vehicles uses plural batteries in parallel connection so as to acquire high voltage and high current. A person who has two or more large electric power products needs a great number of batteries.

In general, the battery charger can charge plural batteries (for example, 4 batteries). When the used has a great number of batteries (more than 4 batteries), the batteries may be separately charged; i.e., the battery charger initially charges some of the batteries at first, and some of the other batteries are charged thereafter. However, it is inconvenient.

SUMMARY

According to one aspect of the present disclosure, a battery charge apparatus is disclosed. The battery charge apparatus includes a first charge module and a second charge module; each of the first charge module and the second charge module includes a main power input terminal, a main power output terminal, an auxiliary power input terminal, an auxiliary power output terminal, a processor, an auxiliary power switch, and at least one charge unit. The auxiliary power switch is connected to the auxiliary power input terminal and the auxiliary power output terminal, and the processor is electrically connected to the auxiliary power switch and the charge unit. The main power input terminal of the first charge module is connected to a main power, and the auxiliary power input terminal of the first charge module is connected to an auxiliary power source; the main power output terminal of the first charge module is connected to the main power input terminal of the second charge module, and the auxiliary power output terminal of the first charge module is connected to the auxiliary power input terminal of the second charge module.

The auxiliary power switch of the first charge module is turned on and the auxiliary power is conducted to the second charge module after a charge-unit-address code is produced and sent to the charge unit of the first charge module by the processor of the first charge module, and a charge-module-address code provided by the first charge module based on a charge-module-address request generated by the second charge module and transmitted to the first charge module is transmitted to the second charge module.

The processor of the first charge module is configured to control the charge unit of the first charge module to perform charge procedure in accordance with the charge-unit-address code when the charge unit is not fully charged, and the processor of the first charge module is configured to generate a charge command having the charge-module-address code and transmit the charge command to the second charge module after the charge unit of the first charge module is fully charged.

The processor of second charge module is configured to control the charge unit of second charge module to perform charge procedure after the charge unit of the second charge module receives the charge command, the second charge module generates a fully charged information when the charge unit of the second charge module is fully charged and transmits the fully charged information to the first charge module.

According to another aspect of the present disclosure, a charge system includes the battery charge apparatus mentioned above and a power supply device is disclosed. The power supply device is configured to generate the main power and the auxiliary power, and the battery charge apparatus is electrically connected to the power supply device.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
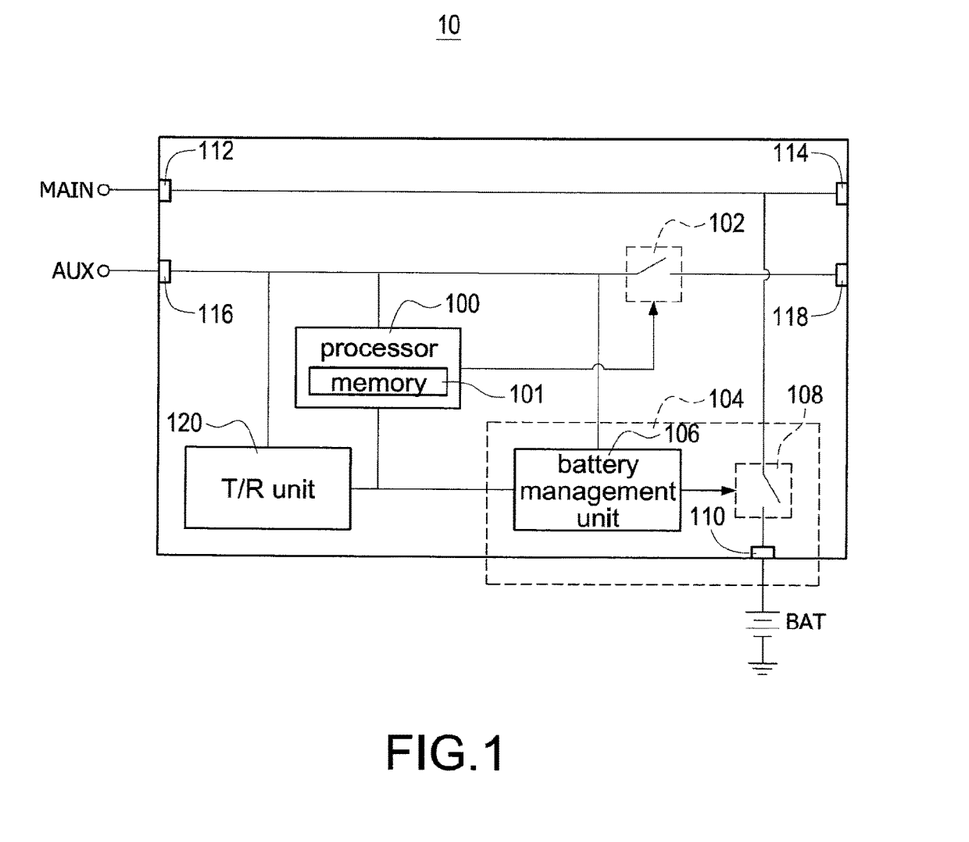
FIG. 1 is a circuit block diagram of a charge module according to a 1st embodiment of the present disclosure.

Reference is made to FIG. 1, which is a circuit block diagram of a charge module according to a 1st embodiment of the present disclosure. In FIG. 1, the charge module 10 includes a processor 100, an auxiliary power switch 102, at least one charge unit 104, a main power input terminal 112, a main power output terminal 114, an auxiliary power input terminal 116, and an auxiliary power output terminal 118.

The main power input terminal 112 is electrically connected to the main power output terminal 114. The auxiliary power switch 102 is arranged between the auxiliary power input terminal 116 and the auxiliary power output terminal 118 and connected thereto. The processor 100 is connected to the auxiliary power switch 102 and configured to generate signal(s) to turn on/off the auxiliary power switch 102. Specifically, when the auxiliary power switch 102 controlled by the processor 100 is turned on, the auxiliary power AUX is conducted to the auxiliary power output terminal 118; on the contrary, when the auxiliary power switch 102 controlled by the processor 100 is turned off, the auxiliary power AUX is not conducted to the auxiliary power output terminal 118.

The charge unit 104 is connected to the processor 100, the main power input terminal 112, and the auxiliary power input terminal 116. The charge unit 104 includes a battery management unit 106, the charge switch 108, and the charge port 110; the battery management unit 106 is electrically connected to the processor 100 and the auxiliary power input terminal 116, the charge switch 108 is electrically connected to the main power input terminal 112 and the battery management unit 106, and the charge port 110 is electrically connected to the charge switch 108. The battery management unit 106 is configured to connect or disconnect the main power MAIN to the battery BAT using the charge switch 108 to charge the battery BAT connected to the charge port 110.

The charge module 10 further includes a receiving and transmitting (T/R) unit 120 electrically connected to the processor 100, the auxiliary power output terminal 116, and the charge unit 104. When a plurality of charge modules 10 are assembled, a wire-based connection or a wireless connected is constituted among the T/R units 120 for transmitting and receiving signal(s) and information.

The charge module 10 is configured to charge the battery BAT electrically connected to the charge port 110. Specifically, the charge module 10 is, for example, electrically connected to a power supply device (not shown) for providing a main power MAIN and an auxiliary power AUX. The main power MAIN is used for charging the battery BAT. The auxiliary power AUX is used for powering the charge module 10. For example, the auxiliary power AUX has a proper voltage to be used for power supplying the processor 100, the power management unit 106, and the T/R unit 120.

Figure 2:
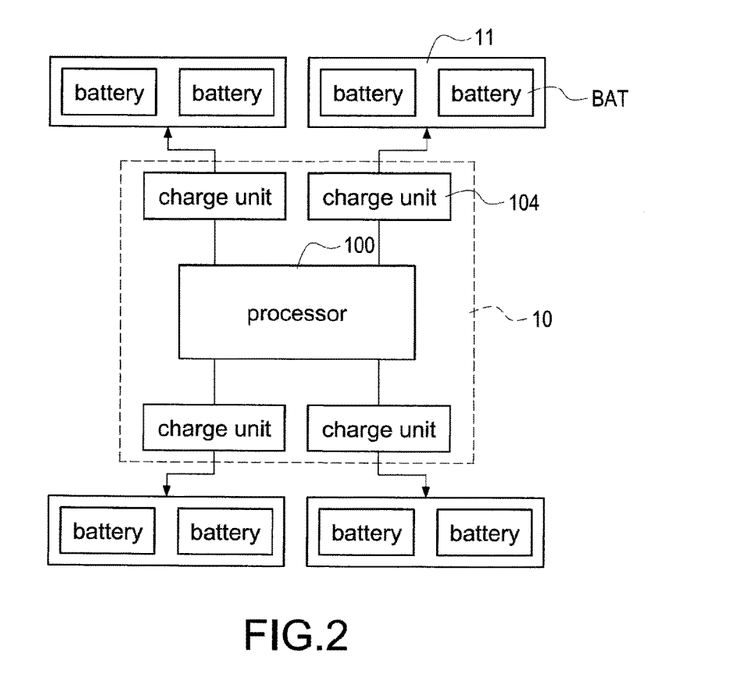
FIG. 2 is a circuit block diagram of a charge module according to a 2nd embodiment of the present disclosure.

The charge module 10 may be designed for charging single battery BAT (as shown in FIG. 1); however, the charge module 10 may be used for charging plural batteries BAT (as shown in FIG. 2). In FIG. 2, the charge module 10 includes a plurality of charge units 104 electrically connected to the processor 100, and each of the charge units 104 is used for charging a battery set 11 including two (or more) batteries BAT.

Figure 3:
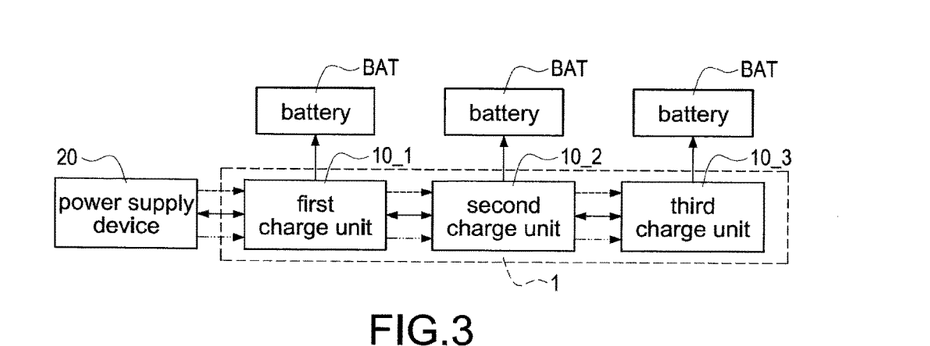
FIG. 3 is a circuit block diagram of a charge system according to a 3rd embodiment of the present disclosure.

Reference is made to FIG. 3, which is a circuit block diagram of a charge system according to a 3rd embodiment of the present disclosure. In FIG. 3, the charge system (its reference numeral is omitted) includes a battery charge apparatus 1 and a power supply device 20. The battery charge apparatus 1 is electrically connected to the power supply device 20 for receiving electric powers (i.e., the main power MAIN and the auxiliary power AUX) provided by the power supply device 20 and is configured to charge the battery BAT.

The battery charge apparatus 1 includes a first charge module 10_1, a second charge module 10_2, and a third charge module 10_3; the first charge module 10_1 is electrically connected to the power supply device 20 and receives the main power MAIN and the auxiliary power AUX, and the second charge module 10_2 is arranged between the first charge module 10_1 and the third charge module 10_3. In FIG. 3, the dotted line shows the main power MAIN transmission path, the two-dot chain line shows the auxiliary power AUX transmission path, and the real line shows the signal(s) and information transmission path.

Figure 4:
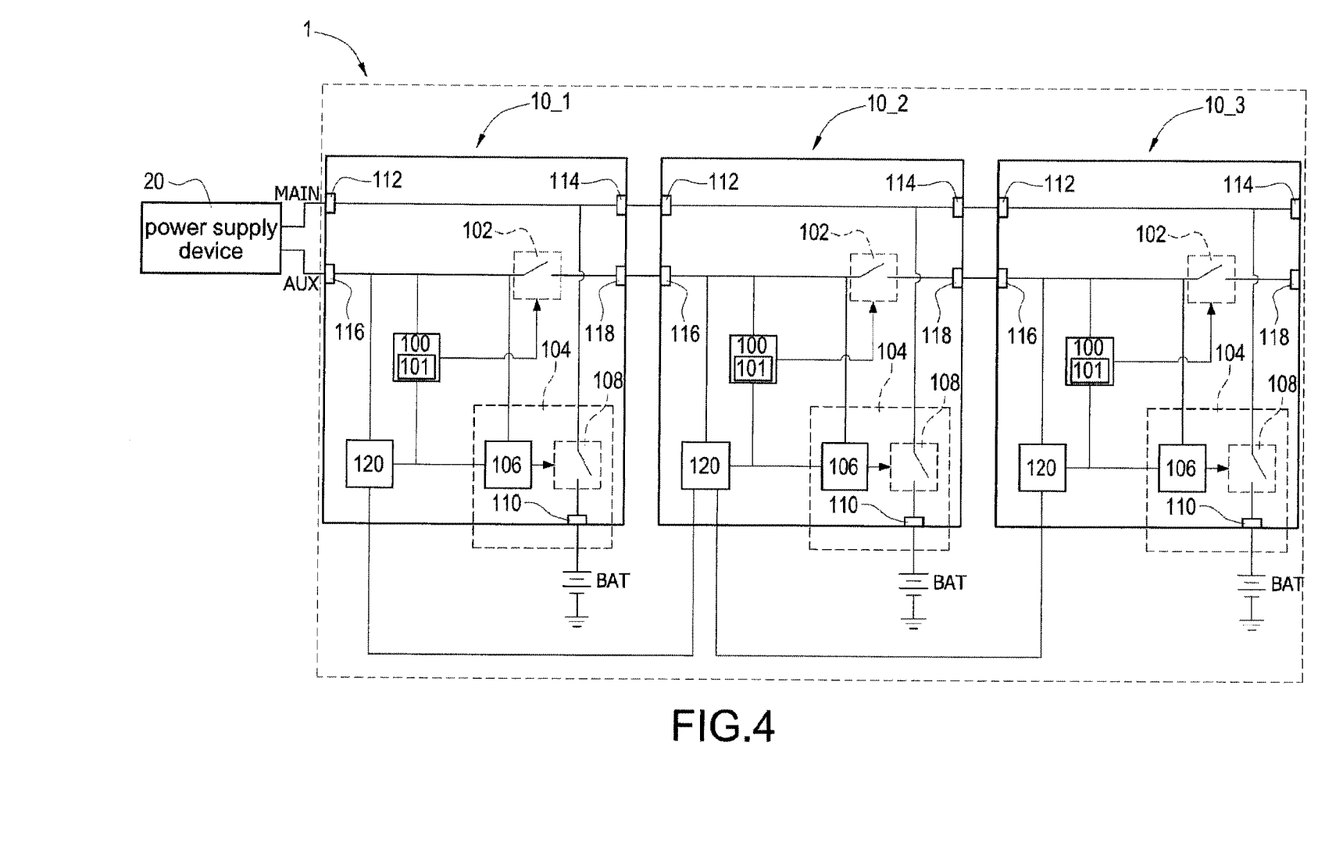
FIG. 4 is another circuit block diagram of the charge system according to the 3rd embodiment of the present disclosure.

Reference is made to FIG. 4, which is another circuit block diagram of the charge system according to the 3rd embodiment of the present disclosure. In FIG. 4, the scheme of each of the first charge module 10_1, the second charge module 10_2, and the third charge module 10_3 is the same as the charge module 10 shown in FIG. 1 mentioned above and is not repeated here for brevity.

The main power input terminal 112 of the first charge module 10_1 is connected to the power supply device 20 for receiving the main power MAIN provided by the power supplying device 20, and the auxiliary power input terminal 116 of the first charge module 10_1 is electrically connected to the power supply device 20 for receiving the auxiliary power AUX provided by the power supplying device 20. The main power output terminal 114 of the first charge module 10_1 is connected to the main power input terminal 112 of the second charge module 10_2, and the auxiliary output terminal 118 of the first charge module 10_1 is connected to the auxiliary power input terminal 116 of the second charge module 10_2. The main power output terminal 114 of the second charge module 10_2 is connected to the main power input terminal 112 of the third charge module 10_3, and the auxiliary output terminal 118 of the second charge module 10_2 is connected to the auxiliary input terminal 116 of the third charge module 10_3. When charge procedure is performed, the main power MAIN needed to be conducted to the third charge module 10_3 is initially conducted to the first charge module 10_1, and is next be conducted to the second charge module 10_2, and is then conducted to the third charge module 10_3.

The T/R units 120 of the first charge module 10_1, the second charge unit 10_2, and the third charge unit 10_3 are used in transmitting and receiving signal(s) and information. In the charge system shown in FIG. 4, wire-based communication is illustrated among the T/R units 120 of the first to third charge modules 10_1~10_3. However, wireless communication (such as infrared communication, Bluetooth communication, or WIFI communication) may be applied to the T/R units 120 of the first to third charge modules 10_1~10_3; wireless communication is convenient because it allows the T/R units 120 of the first to third charge modules 10_1~10_3 to connect to each other without wires. In addition, in the charge system shown in FIG. 3 and FIG. 4, the signal(s) and information transmitted between the first charge module 10_1 and the third charge module 10_3 have to additionally transmit to the second charge module 10_2. Specifically, the signal(s) and information provided by the first charge module 10_1 is first transmitted from the T/R unit 120 of the first charge unit 10_1 to the T/R unit 120 of the second charge module 10_2; the T/R unit 120 of the second charge module 10_2 receives the signal(s) and information. The signal(s) and information provided by the first charge module 10_1 and received by the T/R unit 120 of the second charge module 10_2 is then transmitted to the T/R unit 120 of the third charge module 10_3. Similarly, the signal(s) and information provided by the third charge module 10_3 is first transmitted from the T/R unit 120 of the third charge unit 10_3 to the T/R unit 120 of the second charge module 10_2; the T/R unit 120 of the second charge module 10_2 receives the signal(s) and information. The signal(s) and information provided by the third charge module 10_3 and received by the T/R unit 120 of the second charge module 10_2 is then transmitted to the T/R unit 120 of the first charge module 10_1.

In the present disclosure, the mastership is granted to the charge module that is preferentially receiving the auxiliary power AUX, and the charge module granted the mastership may control the charge sequence of the charge modules in the charge system.

Specifically, in the charge system shown in FIG. 4, when the battery charge apparatus 1 is initially connected to the power supply device 20, the auxiliary switches 102 and the charge switches 108 of the first to third charge modules 10_1~10_3 are turned off, thus the auxiliary power AUX provided by the power supply device 20 is only transmitted to the first charge module 10_1 for activating the processor 100, the battery management unit 106, and the T/R unit 120 thereof, this gives the first charge module 10_1 to grant the mastership. The first charge module 10_1 granted the mastership is configured to control the charge sequence of the first to third charge modules 10_1~10_3. In addition, the first charge module 10_1 granted the mastership may preferentially preform charge procedure.

After the first charge module 10_1 is selected to act as a master of the charge system; if the first charge unit 10_1 includes a plurality of charge units 104, charge-unit-address procedure is performed by the processor 100 of the first charge unit 10_1 for identifying charge sequence of the charge units 104. Specifically, in charge-unit-address procedure, each of the charge units 104 of the first charge unit 10_1 is identified with a unique charge-unit-address code by the processor 100 thereof. Thus, when charge procedure is performed, the charge units 104 of the first charge unit 10_1 are sequentially charged according to the charge-unit-address codes.

After charge-unit-address procedure, the processor 100 of the first charge module 10_1 is configured to control the auxiliary switch 102 thereof to be turned on, and the auxiliary power AUX is conducted to the next stage for recognizing whether the other charge module exists or not.

In detail, when the auxiliary switch 102 of the first charge module 10_1 is turned on, the auxiliary power AUX is conducted to the auxiliary power output terminal 118 thereof and then enters the second charge module 10_2 for activating the processor 100, the battery management unit 106, and the T/R unit 120 of the second charge module 10_2. Besides, a setup information that the mastership is granted by the first charge module 10_1 may be provided by the first charge module 10_1 and transmitted the next stage (for example, the second charge module 10_2).

After the processor 100 and the T/R unit 120 of the second charge module 10_2 are activated by receiving the auxiliary power AUX, the setup information provided by the first charge module 10_1 is received by the T/R unit 120 of the second charge module 10_2 and transmitted to the processor 100 thereof. Thus the second charge module 10_2 knows that the mastership is granted by the first charge module 10_1, and the charge sequence of the second charge module 10_2 have to be identified by the first charge module 10_1. In the other words, the first charge module 10_1 granted the mastership since there is not setup information enters the T/R unit 120 when the auxiliary power AUX is conducted thereto.

The processor 100 of the second charge module 10_2 generates a charge-module-address request, and the charge-module-address request is transmitted to the first charge module 10_1 from the T/R unit 120 of the second charge module 10_2. The charge-module-address request enters the T/R unit 120 of the first charge module 10_1 and transmitted to its processor 100. Therefore, the first charge module 10_1 knows the existence of the second charge module 10_2. The charge-module-address request may include commands to request for a particular charge-module-address code for identifying charge sequence.

Thereafter, charge-module-address procedure is performed by the processor 100 of the first charge module 10_1 to identify the charge sequence of the second charge module 10_2. Charge-module-address procedure starts from the processor 100 of the first charge module 10_1 to produce a charge-module-address code based on the charge-module-address request provided by the second charge module 10_2, and the charge-module-address code is applied to identify the charge sequence of the second charge module 10_2.

The charge-module-address code is transmitted from the T/R unit 120 of the first charge module 10_1 to the T/R unit 120 of the second charge module 10_2, and is transmitted to the processor 100 of the second charge module 10_2. The charge-module-address code may be further stored in the memory 101 arranged in the processor 100.

The processor 100 of the second charge module 10_2 is configured to control the auxiliary switch 102 thereof to be turned on after the charge sequence of the second charge module 10_2 is well identified. Thus the auxiliary power AUX is conducted to the next stage for recognizing whether the other charge module exists or not.

In detail, when the auxiliary switch 102 of the second charge module 10_2 is turned on, the auxiliary power AUX is conducted to the auxiliary power output terminal 118 thereof and then enters the third charge module 10_3 for activating the processor 100, the battery management unit 106, and the T/R unit 120 of the third charge module 10_3. Besides, setup information that the mastership is granted by the first charge module 10_1 is provided by the first charge module 10_1 and transmitted to the third charge module 10_3 through the second charge module 10_2.

After the processor 100 and the T/R unit 120 of the third charge module 10_3 are activated, the setup information provided by the first charge module 10_1 is received by the T/R unit 120 of the third charge module 10_3 and transmitted to the processor 100 thereof. Thus the third charge module 10_3 knows that the mastership is granted by the first charge module 10_1, and the charge sequence of the third charge module 10_3 have to be identified by the first charge module 10_1.

The processor 100 of the third charge module 10_3 generates a charge-module-address request, and the charge-module-address request generated by the third charged module 10_3 is transmitted to the second charge module 10_2 from the T/R unit 120 of the third charge module 10_2, and is further transmitted from the T/R unit 120 of the second charge module 10_2 to the T/R unit 120 of the first charge module 10_1. The charge-module-address request enters the T/R unit 120 of the first charge module 10_1 and transmitted to its processor 100. Therefore, the first charge module 10_1 knows the existence of the third charge module 10_3.

Thereafter, charge-module-address procedure is performed by the processor 100 of the first charge module 10_1 to identify the charge sequence of the third charge module 10_3. Charge-module-address procedure starts from the processor 100 of the first charge module 10_1 to produce a charge-module-address code based on the charge-module-address request provided by the third charge module 10_3, and the charge-module-address code is applied to identify the charge sequence of the third charge module 10_3. The charge-module-address code is transmitted from the T/R unit 120 of the first charge module 10_1 to the T/R unit 120 of the second charge module 10_2, and is further transmitted from the T/R unit 120 of the second charge module 10_2 to the T/R unit 120 the third charge unit 10_3. The charge-module-address code receives by the T/R unit 120 the third charge unit 10_3 is then transmitted to the processor 100 thereof. The charge-module-address code may be further stored in the memory 101 arranged in the processor 100. In should be noted that the charge sequence of the third charge module 10_3 is later than that of the second charge module 10_2.

Thereafter, the processor 100 of the third charge module 10_3 is configured to control the auxiliary switch 102 thereof to be turned on after the charge sequence of the third charge module 10_3 is well identified. Thus the auxiliary power AUX may be transmitted to the next stage for recognizing whether the other charge module exists or not.

In FIG. 4, no other charge module exists in the charge system, thus the setup information sent from the first charge module 10_1 is not received and the first charge module 10_1 does not receive charge-module-address requests; consequently, the first charge module 10_1 determines that no other charge module exists, and the charge system includes three charge modules (i.e., the first charge module 10_1, the second charge module 10_2, and the third charge module 10_3). When determining that no other charge modules exist, charge procedure is performed based on the charge-module-address codes.

It should be noted that if the first charge module 10_1 (and/or second charge module 10_2 and/or the third charge module 10_3) may include a plurality charge units 104, each charge unit 104 is identified by a unique charge-unit-address code by the processor 100 of the first charge 10_1 (and/or the second charge module 10_2 and/or the third charge module 10_3) before the auxiliary switch 102 is turned on. Thus the charge sequence of the charge units 104 is identified. In addition, charge-unit-address code identifying procedure may be performed by the processor 100 at the charge units 104 where the battery BAT is connected. After performing charge-unit-address code identifying procedure, the processor 100 is configured to control the auxiliary switch 102 be turned on to recognize whether the other charge module exists or not.

When the battery charge device 1 performs charge procedure, the first charge module 10_1, the second charge module 10_2, and third charge module 10_3 do not charge the batteries BAT connected thereto at the same time. Specifically, the batteries BAT connected to the second charge module 10_2 and the third charge module 10_3 are charged after the batteries BAT connected to the first charge module 10_1 is fully charged. Thus the problem of long charge time occurs when all of the batteries connected to the battery charge apparatus 1 are charged at the same time is overcame.

Figure 5A:
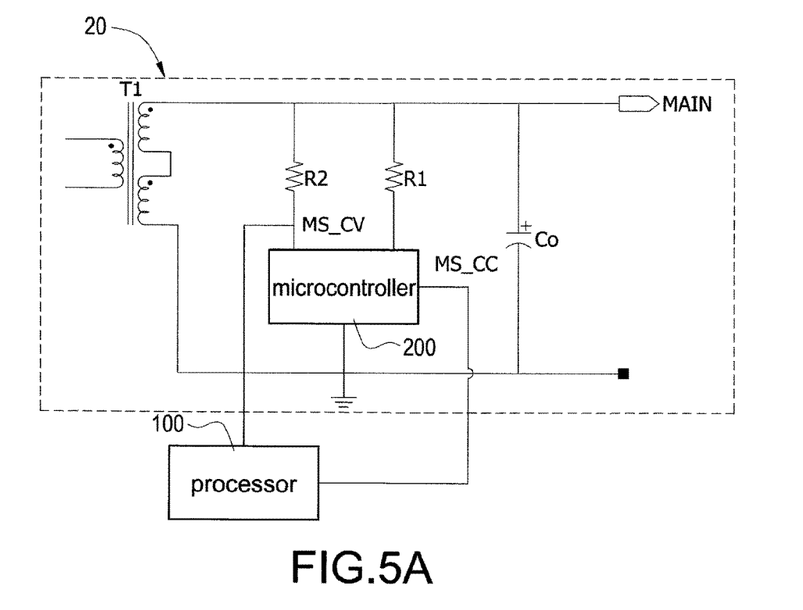
FIG. 5A and FIG. 5B are circuit diagram of the charge system according to the 3rd embodiment of the present disclosure.
Figure 5B:
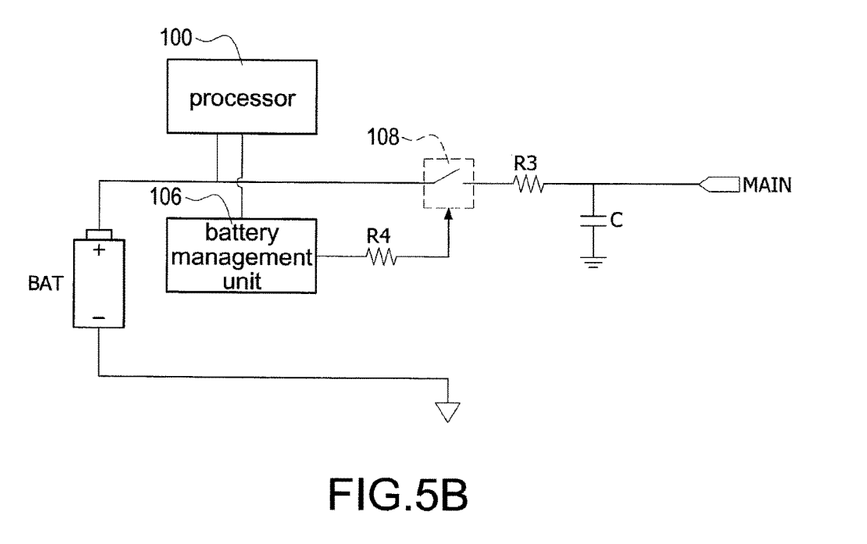

Reference is made to FIGS. 5A and 5B. When the first charge module 10_1 performs charge procedure, the states of the battery BAT connected to the charge unit 104 (as shown in FIG. 4) is preferentially measured by the processor 100 thereof. When the battery BAT is abnormal, the battery charge apparatus 1 may stop performing charge procedure, thus protection of the charge system and the battery BAT is provided. In the meantime, the voltage of the battery BAT is also detected by the processor 100. When the battery BAT is normal, the charge system generates a power request based on the detected result to the power supply device 20 for requesting a proper main power MAIN for charging the battery BAT, thus the charge time can be shortened. Specifically, if the voltage across the battery BAT is 3 volts, the processor 100 may send the power request based on the detected result to the microcontroller 200 of the power supply device 20 to request the main power MAIN with 3.1 volts.

Thereafter, the processor 100 may make the battery management unit 106 turn on the charge switch 108, the battery BAT can thus be charged with requested main power MAIN.

When the first charge module 10_1 includes a plurality of charge units 104, the processor 100 is configured to control the charge units 104 to be sequentially charged based on the charge-unit-address code until all of batteries BAT connected to the charge units 104 of the first charge module 10_1 are well charged.

With refer again to FIG. 3 and FIG. 4. When the batteries BAT connected to the charge units 104 of the first charge module 10_1 are fully charged, the processor 100 of the first charge module 10_1 generates a charge command having the charge-module-address code to the second charge module 10_2. The charge-module-address code is transmitted from the T/R unit 120 of the first charge module 10_1 to T/R unit 120 of the second charge module 10_2.

The second charge module 10_2 control its charge unit 104 to perform charge procedure when receiving the charge command having the charge-module-address code. The processor 100 of the second charge module 10_2 may made the charge units 104 be sequentially charge based on the charge-unit-address code stored in the memory 101 when the second charge module 10_2 includes plural charge units 104.

The processor 100 of the second charge module 10_2 generates fully charged information when the batteries BAT connected to the charge units 104 thereof are fully charged. The fully charged information is transmitted to the first charge module 10_1 from the T/R unit 120 of the second charge module 10_2.

The first charge module 10_1 generates another charge command to the third charge module 10_3 having the charge-module-address code to make the third charge module 10_3 perform charge procedure after receiving the fully charged information sent from the second charge module 10_2. The charge units 104 of the third charge module 10_3 charges the batteries BAT connected thereto in accordance with the charge-unit-address codes. When the batteries BAT connected to the charge units 104 of the third charge module 10_3 are fully charged, the processor 100 of the third charge module 10_3 generates fully charged information and transmits the fully charged information to the first charge module 10_1 from T/R unit 120 of the third charge module 10_3. Therefore, the first charge module 10_1 with mastership knows that all of the batteries BAT connected thereto are fully charged. It should be noted that the charge command transmitted from the first charge module 10_1 to the third charge module 10_3 is initially transmitted to the T/R unit 120 of the second charge module 10_2, and is further transmitted to the T/R unit 120 of the third charge module 10_3 by the T/R unit 120 of the second charge module 10_2. Similarly, the fully charged information transmitted from the third charge module 10_3 to the first charge module 10_1 is initially transmitting to the T/R unit 120 of the second charge module 10_2, and is further transmitted to the T/R unit 120 of the first charge module 10_1 by the T/R unit 102 of the second charge module 10_2.

In FIG. 3 and FIG. 4, the signal(s) and information transmitted between the first charge module 10_1 and the third charge module 10_3 have to transmit to the second charge module 10_2, and then further transmits from the second charge module 10_2 to the target charge module, thus the transmitting time is expended.

In order to shorten the transmitting time of signal(s) and information transmitted between the first charge module 10_1 and the third charge module 10_3 and improve transmitting speed, the connection manner between the T/R units 120 of the first charge module 10_1 and the third charge module 10_3 may be further designated.

Figure 6:
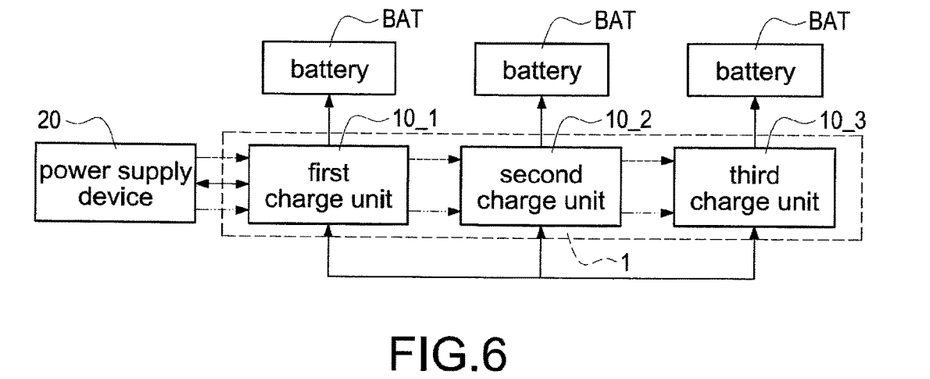
FIG. 6 is a circuit block diagram of a charge system according to a 4th embodiment of the present disclosure.
Figure 7:
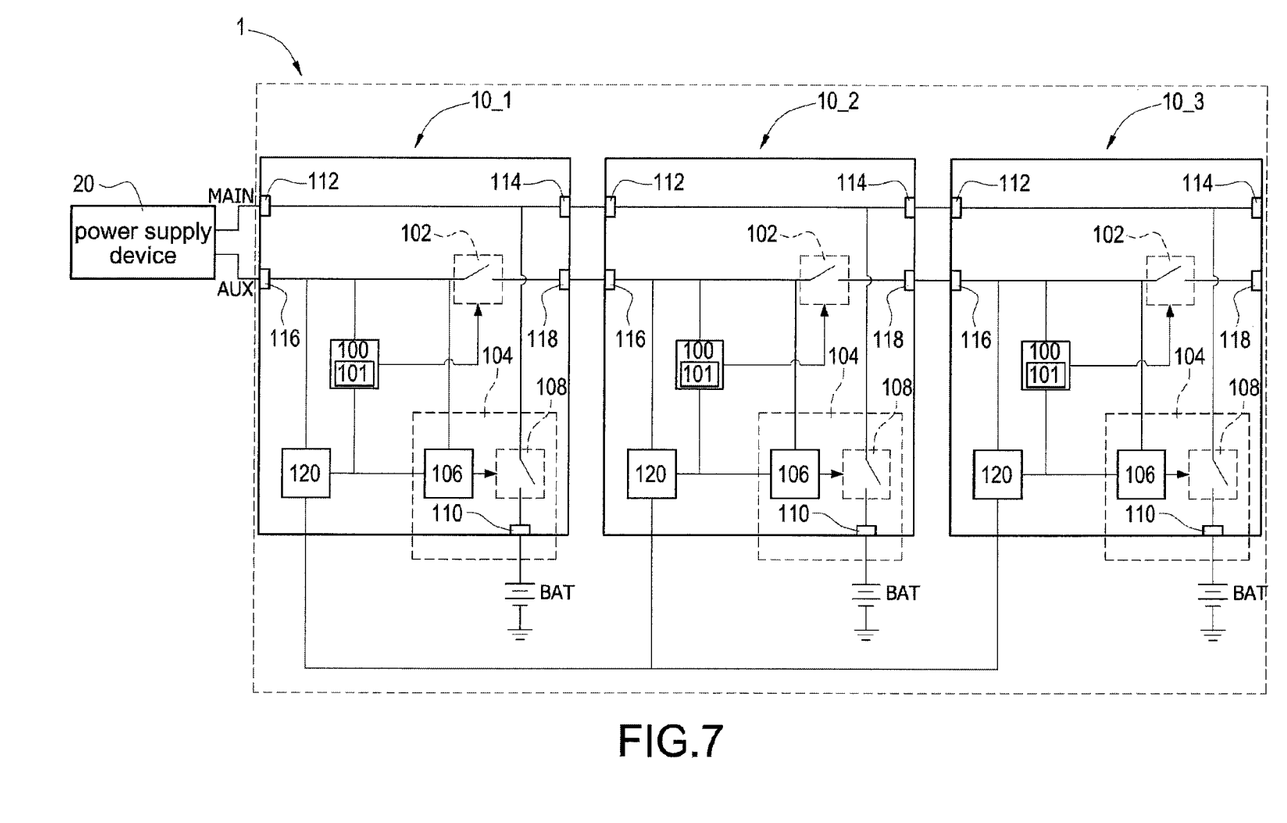
FIG. 7 is another circuit block diagram of a charge module according to the 4th embodiment of the present disclosure.

Reference is made to FIG. 6 and FIG. 7, which are circuit block diagrams of a charge system according to a 4th embodiment of the present disclosure. In FIG. 6 and FIG. 7, the charge system (its reference numeral is omitted) includes a battery charge apparatus 1 and a power supply device 20. The battery charge apparatus 1 electrically connected to the power supply device 20 includes a first charge module 10_1, a second charge module 10_2, and a third charge module 10_3. The scheme for each of the first charge module 10_1, the second charge module 10_2, and the third charge module 10_3 is the same as the charge module 10 shown in FIG. 1 mentioned above and is not repeated here for brevity. It should be noted that the difference between the charge systems in this embodiment and in the 3rd embodiment mentioned above is the transmission path for transmitting signal(s) and information between the first charge module 10_1 and the third charge module 10_3.

In FIG. 6 and FIG. 7, the transmission path for transmitting signal(s) and information between the first charge module 10_1 and the third charge module 10_3 does not connect to the second charge module 10_2. Specifically, the T/R unit 120 of the first charge module 10_1 is directly connected to the T/R unit 120 of the third charge module 10_3, thus the signal(s) and information generated by the first charge module 10_1 is directly transmitted from the T/R unit 120 of the first charge module 10_1 to the T/R unit 120 of the third charge module 10_3. Similarly, the signal(s) and information generated by the third charge module 10_3 is directly transmitted from the T/R unit 120 of the third charge module 10_3 to the T/R unit 120 of the first charge module 10_1. This gives the transmission time of the signal(s) and information transmitted between the first charge module 10_1 and the third charge module 10_3 can be shortened. In addition, when the T/R unit 120 of the second charge module 10_2 is abnormal or broke down, the first charge module 10_1 and the third charge module 10_3 can be successfully communication. On the contract, in FIG. 3 and FIG. 4, when the T/R unit 120 of the second charge module 10_2 is abnormal or broke down, the first charge module 10_1 cannot be communicated with the third charge module 10_3, and the batteries BAT connected to the third charge module 10_3 cannot be charged.

In FIG. 6, the dotted line shows the main power MAIN transmission path, and the two-dot chain line shows the auxiliary power AUX transmission path; the transmission directions and functions of the main power MAIN and auxiliary power AUX among the first to third charge module 10_1~10_3 shown in FIG. 6 are the same as that shown in FIG. 3 mentioned above and are not repeated here for brevity, and the charge system shown in the FIG. 6 and FIG. 7 can achieve the functions as the charge system shown in FIG. 3 and FIG. 4 does.

Figure 8:
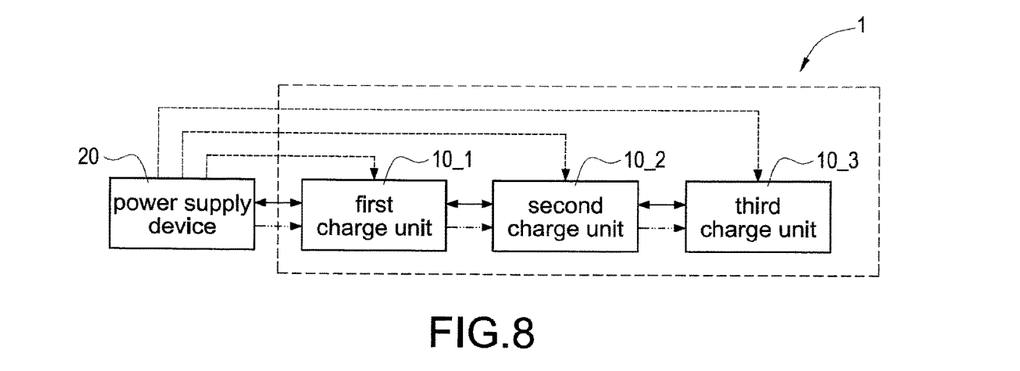
FIG. 8 is a circuit block diagram of a charge module according to a 5th embodiment of the present disclosure.

Reference is made to FIG. 8, which is circuit block diagram of a charge system according to a 5th embodiment of the present disclosure. In FIG. 8, the charge system (its reference numeral is omitted) includes a battery charge apparatus 1 and a power supply device 20. The battery charge apparatus 1 electrically connected to the power supply device 20 includes a first charge module 10_1, a second charge module 10_2, and a third charge module 10_3. The scheme for each of the first charge module 10_1, the second charge module 10_2, and the third charge module 10_3 is the same as the charge module 10 shown in FIG. 1 mentioned above and is not repeated here for brevity.

In FIG. 8, the dotted line shows the main power MAIN transmission path, the two-dot chain line shows the auxiliary power AUX transmission path, and the real line shows the signal(s) and information transmission path; the transmission directions and functions of the auxiliary power AUX and signal(s) and information among the first to third charge module 10_1~10_3 shown in FIG. 8 are the same as that shown in FIG. 3 mentioned above and are not repeated here for brevity. In the other words, address process (including charge-unit-address procedure and charge-module-address procedure), which is performed before charge procedure, is the same as the 3rd embodiment mentioned above. However, when performing charge procedure, the main power MAIN is directly transmitted to the first charge module 10_1, the second charge module 10_2, and the third charge module 10_3.

Specifically, in this embodiment, the main power input terminals 112 of the first to third charge module 10_1~10_3 are directly connected to the power supply device 20, and the main power MAIN is conducted to the charge unit(s) 104 of the first charge module 10_1 to charge the batteries BAT connected thereto after address procedure is performed. After the batteries BAT connected to the first charge module 10_1 are fully charged and the second charge module 10_2 receives the charge command provided by the first charge module 10_1, the charge unit(s) 104 may perform charge procedure based on the charge-unit-address codes, and the main power MAIN is directly conducted to the charge unit(s) 104 of the second charge module 10_2.

In the 3rd embodiment of the present disclosure, however, after the batteries BAT connected to the first charge module 10_1 are fully charged and the second charge module 10_2 receives the charge command provided by the first charge module 10_1, the main power MAIN conducted to the second charge module 10_2 for charging the batteries BAT connected thereto by passing through the first charge module 10_1. As the result, when the first charge module 10_1 is broke, the batteries BAT connected the second charge module 10_2 (and the third charge module 10_3) cannot be charged.

On the contrary, in this embodiment (the 5th embodiment), the first to third charge module 10_1~10_3 are directly connected to the power supply device 20 for receiving the main power MAIN, thus the power transmitting loss is reduced and when one of the charge modules is broke, the batteries BAT of the other charge module can be successfully charged.

In FIG. 8, the battery charge apparatus 1 includes three charge modules (i.e., the first charge module 10_1, the second charge module 10_2, and the third charge module 10_3); however, the number of the charge modules is not limited to the specific numbers shown in the embodiment. In addition, the auxiliary power AUX and the signal(s) and information of the charge modules may be in a series-transmission manner, exclusive the charge module with mastership. Furthermore, the main power MAIN is directly conducted to all of the charge modules when performing charge procedure. The charge system shown in the FIG. 8 can achieve the functions as the charge system shown in FIG. 3 and FIG. 4 does.

Figure 9:
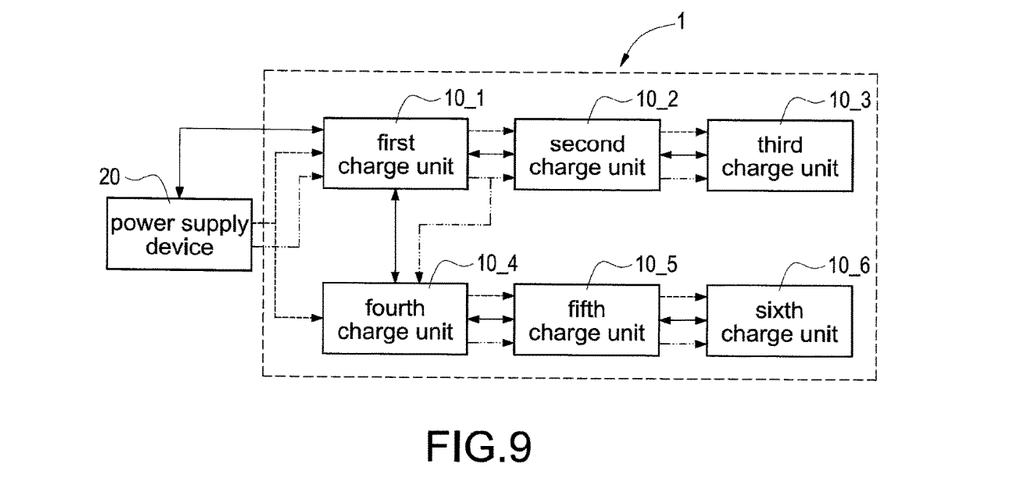
FIG. 9 is a circuit block diagram of a charge module according to a 6th embodiment of the present disclosure.

Reference is made to FIG. 9, which is a circuit block diagram of a charge system according to a 6th embodiment of the present disclosure. In FIG. 9, the charge system (its reference numeral is omitted) includes a battery charge apparatus 1 and a power supply device 20. The battery charge apparatus 1 electrically connected to the power supply device 20 includes a first charge module 10_1, a second charge module 10_2, a third charge module 10_3, a fourth charge module 10_4, a fifth charge module 10_5, and a sixth charge module 10_6. The scheme for each of the first charge module 10_1, the second charge module 10_2, the third charge module 10_3, the fourth charge module 10_4, the fifth charge module 10_5, and the sixth charge module 10_6 is the same as the charge module 10 shown in FIG. 1 mentioned above and is not repeated here for brevity.

The first charge module 10_1 is electrically connected to the power supply device 20, and receives the main power MAIN and the auxiliary power AUX provided by the power supply device 20. The transmission paths of the main power MAIN (shown by dotted line), the auxiliary power AUX (shown by two-dot chain line), and signal(s) and information (shown by real line) among the power supply device 20, the first to third charge module 10_1~10_3 are the same as that shown in FIG. 3 mentioned above.

The transmission paths of the main power MAIN (shown by dotted line), the auxiliary power AUX (shown by two-dot chain line), and signal(s) and information (shown by real line) among the power supply device 20, the fourth to sixth charge module 10_4~10_6 are the same as the transmission paths of the main power MAIN, the auxiliary power AUX, and the signal(s) and information shown in FIG. 3 mentioned above. The fourth charge module 10_4 is electrically connected to the power supply device 20 for receiving the main power MAIN, and is electrically connected to the first charge module 10_1 for receiving the auxiliary power AUX transmitted by the first charge module 10_1 and being communication with the first charge module 10_1.

The first charge module 10_1 is preferentially receives the auxiliary power source AUX and is then selected to act as a master of the charge system; therefore, the first charge module 10_1 can identify charge sequence of the first to sixth charge module 10_2~10_6.

In FIG. 9, the battery charge apparatus 1 includes sixth charge module; however, the number of the charge modules are not limited to the specific numbers shown in the embodiment. In addition, the auxiliary power AUX and the signal(s) and information of the charge modules may be in a series-transmission manner, exclusive the charge module with mastership. The charge system shown in the FIG. 9 can achieve the functions as the charge system shown in FIG. 3 and FIG. 4 does.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A battery charge apparatus comprising a first charge module and a second charge module, each of the first charge module and the second charge module comprising a main power input terminal, a main power output terminal, an auxiliary power input terminal, an auxiliary power output terminal, a processor, an auxiliary power switch, and at least one charge unit, the auxiliary power switch connected to the auxiliary power input terminal and the auxiliary power output terminal, and the processor electrically connected to the auxiliary power switch and the charge unit;

wherein the main power output terminal of the first charge module is connected to the main power input terminal of the second charge module, the auxiliary power output terminal of the first charge module is connected to the auxiliary power input terminal of the second charge module, the main power input terminal of the first charge module is connected to a main power, and the auxiliary power input terminal of the first charge module is connected to an auxiliary power;

wherein the auxiliary power switch of the first charge module is turned on and the auxiliary power is conducted to the second charge module after a charge-unit-address code is produced and sent to the charge unit of the first charge module by the processor of the first charge module, and a charge-module-address code provided by the first charge module is transmitted to the second charge module based on a charge-module-address request generated by the second charge module and transmitted to the first charge module;

wherein the processor of the first charge module is configured to control the charge unit of the first charge module to perform charge procedure in accordance with the charge-unit-address code when the charge unit of the first charge module is not fully charged, and the processor of the first charge module is configured to generate a charge command having the charge-module-address code and transmits the charge command to the second charge module after the charge unit of the first charge module is fully charged;

wherein the processor of second charge module is configured to control the charge unit of second charge module to perform charge procedure after the charge unit of the second charge module receives the charge command, the second charge module generates a fully charged information when the charge unit of the second charge module is fully charged and transmits the fully charged information to the first charge module; and wherein the auxiliary power is used to first activate one of the first charge module and the second charge module and then to activate the remain of the first charge module and the second charge module, the first charge module and the second charge module are charged according to a sequence of activating.

2. The battery charge apparatus of claim 1, wherein each of the first charge module and the second charge module further comprises a receiving and transmitting unit electrically connected to the auxiliary power input terminal, the processor, and the charge unit, the receiving and transmitting unit of the first charge module is configured to transmit the charge-module-address code and receive the charge-module-address request and the fully charged information.

3. The battery charge apparatus of claim 2, wherein the receiving and transmitting units of the first charge module and the second charge module are in a wire-based connection or in a wireless connection.

4. The battery charge apparatus of claim 2, wherein each of the first charge module and the second charge module further comprises a memory connected to the receiving and transmitting unit and the processor.

5. The battery charge apparatus of claim 1, wherein the charge unit comprises:
a battery management unit electrically connected to the auxiliary power output terminal and the processor;
a charge switch electrically connected to the main power input terminal and the battery management unit; and
a charge port electrically connected to the charge switch and at least one battery.

6. The battery charge apparatus of claim 3, further comprising a third charge module comprising a main power input terminal, a main power output terminal, an auxiliary power input terminal, an auxiliary power output terminal, a processor, an auxiliary power switch, and at least one charge unit, wherein the auxiliary power switch is connected to the auxiliary power input terminal and the auxiliary power output terminal, the processor is electrically connected to the auxiliary power switch and the charge unit, the main power input terminal of the third charge module is connected to the main power output terminal of the second charge module, and the auxiliary power input terminal of the third charge module is connected to the auxiliary power output terminal of the second charge module;

wherein the auxiliary power switch of the second charge module is turned on and the auxiliary power is conducted to the third charge module after another charge-unit-address code is produced and sent to the charge unit of the second charge module by the processor of the second charge module, and a charge-module-address code provided by the first charge module is transmitted to the third charge module based on a charge-module-address request generated by the third charge module and transmitted to the first charge module;

wherein the processor of the first charge module is configured to generate another charge command having the charge-module-address code and transmits the charge command to the third charge module after receiving the fully charged information sent from the second charge module;

wherein the processor of third charge module is configured to control the charge unit of third charge module to perform charge procedure after the charge unit of the second charge module receives the charge command, and the third charge module generates another fully charged information when the charge unit of the third charge module is fully charged and transmits the fully charged information to the first charge module; and wherein the auxiliary power is used to first activate one of the first charge module, the second charge module and the third charge module and then to activate the remains of the first charge module, the second charge module and the third charge module, the first charge module, the second charge module and the third charge module are charged according to a sequence of activating.

7. The battery charge apparatus of claim 6, wherein the charge-module-address request generated by the third charge module is directly transmitted to the first charge module.

8. The battery charge apparatus of claim 6, wherein the charge-module-address request generated by the third charge module is transmitted to the first charge module through the second charge module.

9. A charge system comprising:
a power supply device for providing a main power and an auxiliary power; and
a battery charge apparatus electrically connected to the power supply device, wherein the battery charge apparatus comprises a first charge module and a second charge module, each of the first charge module and the second charge module comprises a main power input terminal, a main power output terminal, an auxiliary power input terminal, an auxiliary power output terminal, a processor, an auxiliary power switch, and at least one charge unit, the auxiliary power switch is connected to the auxiliary power input terminal and the auxiliary power output terminal, and the processor is electrically connected to the auxiliary power switch and the charge unit;

wherein the main power output terminal of the first charge module is connected to the main power input terminal of the second charge module, the auxiliary power output terminal of the first charge module is connected to the auxiliary power input terminal of the second charge module, the main power input terminal of the first charge module is connected to the main power, and the auxiliary power input terminal of the first charge module is connected to the auxiliary power;

wherein the auxiliary power switch of the first charge module is turned on and the auxiliary power is conducted to the second charge module after a charge-unit-address core is produced and sent to the charge unit of the first charge module by the processor of the first charge module, and a charge-module-address code provided by the first charge module is transmitted to the second charge module based on a charge-module-address request generated by the second charge module and transmitted to the first charge module;

wherein the processor of the first charge module is configured to control the charge unit of the first charge module to perform charge procedure in accordance with the charge-unit-address code when the charge unit of the first charge module is not fully charged, and the processor of the first charge module is configured to generate a charge command having the charge-module-address code and transmits the charge command to the second charge module after the charge unit of the first charge module is fully charged;

wherein the processor of second charge module is configured to control the charge unit of second charge module to perform charge procedure after the charge unit of the second charge module receives the charge command, the second charge module generates a fully charged information when the charge unit of the second charge module is fully charged and transmits the fully charged information to the first charge module; and wherein the auxiliary power is used to first activate one of the first charge modules and the second charge module and then to activate the remain of the first charge module and the second charge module, the first charge module and the second charge module are charged according to a sequence of activating.

10. The charge system of claim 9, wherein the main power provided by the power supply device is conduct to the second charge module through the first charge module during the charge unit of the second charge module is preforming charge procedure.

11. The charge system of claim 9, wherein the main power provided by the power supply device is directly conduct to the second charge module during the charge unit of the second charge module is preforming charge procedure.

12. The charge system of claim 9, wherein each of the first charge module and the second charge module further comprises a receiving and transmitting unit electrically connected to the auxiliary power input terminal, the processor, and the charge unit, the receiving and transmitting unit of the first charge module is configured to transmit the charge-module-address code and receive the charge-module-address request and the fully charged information.

13. The charge system of claim 9, wherein the receiving and transmitting units of the first charge module and the second charge module are in a wire-based connection or in a wireless connection.

14. The charge system of claim 9, wherein each of the first charge module and the second charge module further comprises a memory connected to the receiving and transmitting unit and the processor.

15. The charge system of claim 9, wherein the charge unit comprises:
a battery management unit electrically connected to the auxiliary power output terminal and the processor;
a charge switch electrically connected to the main power input terminal and the battery management unit; and a charge port electrically connected to the charge switch and at least one battery.

16. The charge system of claim 13, wherein further comprising a third charge module comprising a main power input terminal, a main power output terminal, an auxiliary power input terminal, an auxiliary power output terminal, a processor, an auxiliary power switch, and at least one charge unit,
- wherein the auxiliary power switch is connected to the auxiliary power input terminal and the auxiliary power output terminal, the processor is electrically connected to the auxiliary power switch and the charge unit, the main power input terminal of the third charge module is connected to the main power output terminal of the second charge module, and the auxiliary power input terminal of the third charge module is connected to the auxiliary power output terminal of the second charge module;
- wherein the auxiliary power switch of the second charge module is turned on and the auxiliary power is conducted to the third charge module after another charge-unit-address code is produced and sent to the charge unit of the second charge module by the processor of the first charge module, and a charge-module-address code provided by the first charge module is transmitted to the third charge module based on a charge-module-address request generated by the third charge module and transmitted to the first charge module;
- wherein the processor of the first charge module is configured to generate another charge command having the charge-module-address code and transmits the charge command to the third charge module after receiving the fully charged information sent from the second charge module;
- wherein the processor of third charge module is configured to control the charge unit of third charge module to perform charge procedure, and the third charge module generates another fully charged information when the charge unit of the third charge module is fully charged and transmits the fully charged information to the first charge module; and
- wherein the auxiliary power is used to first activate one of the first charge module, the second charge module and the third charge module and then to activate the remains of the first charge module, the second charge module and the third charge module, the first charge module, the second charge module and the third charge module are charged according to a sequence of activating.

17. The charge system of claim 16, wherein the charge-module-address request generated by the third charge module is directly transmitted to the first charge module.

18. The charge system of claim 16, wherein the charge-module-address request generated by the third charge module is transmitted to the first charge module through the second charge module.

* * * * *